United States Patent
Engel

[15] 3,655,928
[45] Apr. 11, 1972

[54] DEVICE FOR DETECTING AND SIGNALING A CHANGE OF MORE THAN A PRESCRIBED AMOUNT IN THE RATE OF MOVEMENT OF AN OBJECT

[72] Inventor: Elton D. Engel, Livonia, Mich.
[73] Assignee: Ford Motor Company, Dearborn, Mich.
[22] Filed: Oct. 23, 1970
[21] Appl. No.: 83,559

[52] U.S. Cl. ..................................200/61.45, 280/150 AB
[51] Int. Cl. ........................................................H01h 35/14
[58] Field of Search ..........................200/61.45–61.53, 200/168 G, 83 N; 340/261, 262; 280/150 AB

[56] References Cited

UNITED STATES PATENTS

| 3,492,450 | 1/1970 | Stockdale et al. | 200/61.45 |
| 3,549,169 | 12/1970 | Oldberg | 200/61.53 X |
| 2,111,168 | 3/1938 | Chansor | 200/83 N |

Primary Examiner—Robert K. Schaefer
Assistant Examiner—M. Ginsburg
Attorney—John R. Faulkner and William E. Johnson

[57] ABSTRACT

The device detects and signals a change of more than a prescribed amount in the rate of movement of an object. The major elements forming the device include the following. A housing is secured to the object. This housing has a first contact area formed on the surface area in the interior thereof. A sphere is movably contained by a resiliently deformable confinement within the interior of the housing. The confinement is interposed between the sphere and the surface area forming the interior of the housing. The confinement is deformable toward the interior surface when the sphere moves within the confinement in response to a change in the rate of movement of the object. A second contact area is formed on the surface of the confinement in juxtaposition to the first contact area on the interior of the housing. When the sphere deforms the confinement sufficiently, in response to a change in the rate of movement of the object of more than a predetermined amount, the first and the second contact areas are brought together to complete a circuit therethrough. Upon closing of the contacts, appropriate circuits indicate that the change of more than a prescribed amount has taken place in the rate of movement of the object.

6 Claims, 2 Drawing Figures

Patented April 11, 1972

3,655,928

INVENTOR
Elton D. Engel
BY John R. Faulkner
William E. Johnson
ATTORNEYS 3,655,928

DEVICE FOR DETECTING AND SIGNALING A CHANGE OF MORE THAN A PRESCRIBED AMOUNT IN THE RATE OF MOVEMENT OF AN OBJECT

BACKGROUND OF THE INVENTION

The use of inflatable air bag restraint systems has been proposed for protection of occupants of a vehicle when the vehicle is involved in a crash. Such restraint systems generally include an inflatable air bag stored in a position adjacent the occupant seated within the vehicle. A gas supply for inflating the bag is also provided as well as a control device which permits inflation of the bag by the gas supply when a crash detecting and signaling device triggers the control device.

The crash detecting and signaling device used with these restraint systems must be of a type which detects a change in the rate of movement of the vehicle. The device also must be able to descriminate between any normal changes in the rate of movement which occurs during operation of the vehicle and the substantially larger changes in the rate of movement which occur during a crash of the vehicle. Thus, any device for detecting and signaling that a crash of the vehicle is going to occur must have the following attributes. It must be reliable over the years of operation of the vehicle. It must be economical to construct. It must be sensitive to changes in vehicle rates so that the device is able to discriminate between normal changes in vehicle rates and excessive changes in vehicle rates which indicate the occurrence of a crash. The device must be effective in operation when a crash of the vehicle occurs in a direction other than the normal direction of movement of the vehicle as when the vehicle is impacted at an angle to the front thereof.

The detecting and signaling device of this invention has been designed so that it is: reliable over its operational life, economical to construct, efficient in operation, capable of discriminating between normal changes in the rate of movement of the vehicle and changes of the rate of movement of excessive amounts, and operational to detect crashes in many directions.

SUMMARY OF THE INVENTION

This invention relates to a detecting and signaling device and, more particularly, to a device for detecting and signaling a change of more than a prescribed amount in the rate of movement of an object such as a vehicle.

In accordance with the general teachings of this invention, a device for detecting and signaling a change of more than a prescribed amount in the rate of movement of an object includes at least the following elements. A housing, secured to the object, has an interior sufficiently large to movably receive a sphere therewithin. A first contact area is formed on at least a portion of the interior surface of the housing. A resiliently deformable confinement is positioned within the interior of the housing for movably enclosing a metal sphere therewithin. The sphere is enclosed in such a manner that the confinement is interposed between the interior surface of the housing and the sphere. The confinement is resiliently deformable towards the interior surface of the housing. The confinement is deformed by movement of the sphere in proportion to the magnitude of the change in the rate of movement of the object to which the housing is secured. A second contact area is formed on the surface of the confinement in juxtaposition to the first contact area on the interior surface of the housing. When the sphere deforms the confinement more than a predetermined amount, in response to substantial change in the rate of movement of the object, the first and the second contact areas are brought together to close the same. Circuit forming elements are provided for completing a circuit through the closed contact areas to signal that the device has detected a change of more than a prescribed amount in the rate of movement of the object. This signal is then employed to trigger the gas supply of the air bag restraint system so that the inflatable air bag is deployed in front of the occupant of the vehicle.

GENERAL DESCRIPTION OF THE PREFERRED EMBODIMENT CONSTRUCTION

Figure 1:
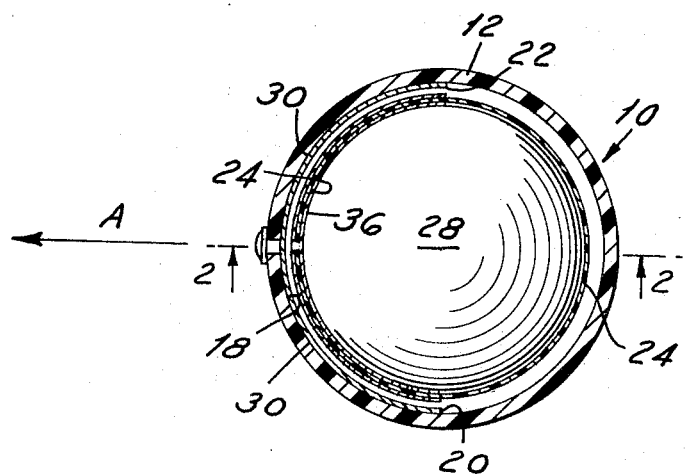
FIG. 1 is a plan view, in cross section, taken along line 1—1 of FIG. 2 showing in detail the detecting and signaling device of this invention.
Figure 2:
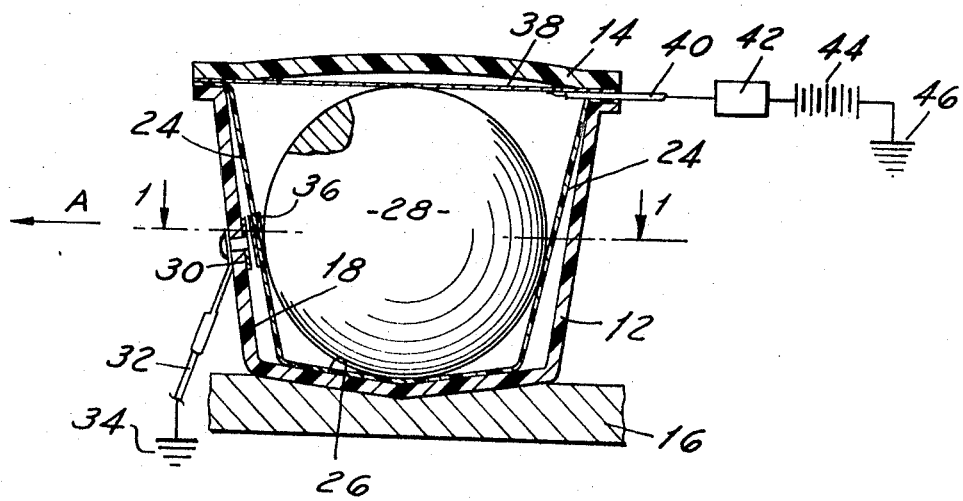
FIG. 2 is an elevation view, in cross section, taken along line 2—2 of FIG. 1 showing the detecting and signaling device of this invention in greater detail.

The detecting and signaling device of this invention is shown in FIGS. 1 and 2 and generally identified therein by the numeral 10. The device is used for signaling a change of more than a prescribed amount in the rate of movement of an object such as a vehicle and, more particularly, the device may be utilized to provide a positive sensor response during a front end impact of the vehicle. The signaling of the front end impact or impending crash causes activation of the gas supply which, in turn, inflates the air bag in front of the occupant of the vehicle.

The detecting and sensing device 10 has, as a major element, a housing formed as a two-piece structure with a body 12 and a cover 14 (only in FIG. 2). The device is secured by any suitable means to an object such as a body member 16 of a vehicle for movement with the member. In general, the movement of the vehicle and its body member is in the principal direction indicated by arrow A of FIG. 1. In case of a vehicle, this direction would be toward the front of the vehicle and would be the direction in which the vehicle is normally operated.

The body 12 of the device 10 has a circular cross section as is best seen in FIG. 1. The interior surface of the body 12 has a principal surface 18 forming a portion thereof. This principal surface faces the interior of the body in a direction generally opposed to the direction of principal movement of the vehicle which is indicated by the arrow A in the drawings. As shown in FIG. 1, the principal surface 18 extends about 180° of arc of the interior surface of the housing from a position indicated by the numeral 20 to a position indicated by the numeral 22 in FIG. 1.

A confinement device, in the form of a mesh bag 24, is provided within the interior of the body 12 of the device 10. The mesh bag may be formed of nylon material. The mesh bag is positioned within the interior of the body that the open or free end of the bag is entrapped between the body and the cover 14 of the device. The closed end 26 of the bag is bonded smoothly to the bottom or closed end of the body 12.

A metal sphere 28, formed from a conductive metal such as brass, is positioned within the interior of the mesh bag 24. The sphere is movable within the confinement in response to changes of the rate of movement of the object. Upon movement of the sphere, the mesh bag, interposed between the sphere and the interior surface of the housing is deformed elastically toward the interior surface of the housing. Once the rate of change detected by the device has decreased to zero, the metal sphere will return to a normal or neutral position in the middle of the body 12 of the device 10. This neutral position is illustrated in the drawings.

A first contact area 30 is formed, as by a plating operation, on the interior wall of the body 12 of the device 10. The first contact area 30 extends, as best seen in FIG. 1, along the entire principal surface 18 of the interior surface of the body 12 from points 20 to 22. As seen in FIG. 2, a lead wire 32 is provided from the first contact 30 to ground 34.

A second contact area 36 is provided on the area of the mesh bag in juxtaposition to the first contact area 30 on the interior surface of the body 12. Since the contact area is formed on the mesh bag, as by a plating operation, contact material exists on both the surface of the bag facing the principal surface 18 and on the surface of the bag in engagement with the sphere 28. The first and second contact areas are so located that the areas extend at least partially along the axis of the sphere 28 as viewed in FIG. 2.

A ground and retainer plate 38, shown only in FIG. 2, is sealed between the cover 14 and the body 12 of the detecting and sensing device 10 to hold the sphere 28 in its normal position. THe plate 38 is formed of a conductive material so as to make electrical contact to the sphere through the plate from a lead wire 40 which passes through the area between the cover and the body of the device. The lead 40 is, in turn, connected to a triggering device 42 for triggering the activation of an air bag restraint system. The triggering device, in turn, is connected to a source of electrical energy 44 and ground 46 as shown in FIG. 2.

OPERATION

The detecting and sensing device 10 of this invention operates in the following manner. The device is secured to a rigid member of a vehicle such as the support beam 16 and when the vehicle is driven at a constant rate, the sphere 28 is positioned in its normal position within the mesh bag 24. When the vehicle experiences a change in the rate of speed, such as when the vehicle slows down for a stop light or other obstruction, the sphere 28 is displaced from its normal position generally in the direction of the principal surface 18 of the interior of the body 12. The displacement of the sphere, however, is not sufficient during these normal changes in speed so that the first contact area 30 comes into engagement with the second contact area 36 to complete the circuit through the triggering device 42 for the air bag restraint system.

When a substantial change of the rate of movement of the vehicle occurs, as for example, when the vehicle is involved in a crash, the sphere 28 is displaced from its normal position by a substantial amount. The substantial displacement of the sphere causes the deforming of the mesh bag 24 to a sufficient extent that the second contact area 36 is brought into engagement with the first contact area 30. The closing of the two contact areas completes the circuit from ground 46 through battery 44, the triggering device 42. the lead 40, the ground and retainer plate 38, the metal sphere 28, the second contact area 36, the first contact area 30, the lead wire 32 and ground 34 whereby the triggering device actuates the air bag restraint system.

Since the first contact area 30 and the second contact area 36 extend around their respective supporting members over 180° of arc, as is best illustrated in FIG. 1, either a direct straight ahead or a angular impact may be sufficient to displace the sphere 28 within its confinement to close the contact areas to cause activation of the restraint system. Thus, the triggering device is as sensitive to certain side impacts as it is to head-on impacts.

The invention disclosed will have many modifications which will be apparent to those skilled in the art in view of the teachings of this specification. It is intended that all modifications which fall within the true spirit and scope of this invention be included within the scope of the appended claims.

I claim:

1. A device for detecting and signaling a change of more than a prescribed amount in the rate of movement of an object, which device comprises:
   a housing secured to the object, said housing having a generally cylindrical interior portion within which a sphere may be confined, said interior portion of said housing having a principal surface which faces the interior of said housing in a direction generally opposite the direction in which said object is principally moved;
   a first contact area formed on at least a portion of said principal surface of said housing;
   a metal sphere;
   a resiliently deformable bag of mesh material positioned within said interior portion of said housing holding said metal sphere normally in a position spaced from said principal surface of said housing, said bag being deformed by said sphere towards said principal surface of said housing when the rate of movement of the object in its principal direction is changed;
   a second contact area formed on said bag in juxtaposition to said first contact area formed on the interior of said housing whereby when said sphere deforms said bag more than a predetermined amount in response to a rate of change of movement of the object more than a predetermined amount, said first and said second contact areas are brought together to complete a circuit therethrough; and
   circuit means for completing a circuit through the closed contact areas thereby to signal that said device has detected a change of more than a prescribed amount in the rate of movement of the object.

2. The device of claim 1 wherein: said second contact area is on both sides of the surface of the mesh material of said bag which faces said principal surface of said housing, wherein said second contact area is positioned on said bag at a location adjacent the diameter of said sphere, and wherein said first contact area is located on said principal surface of said housing in juxtaposition to said second contact area.

3. The device of claim 2 wherein: said principal surface of said housing extends about the cross section of said housing for at least 180° of arc, and wherein both said first and said second contact areas extend for at least 180° of arc on their supporting surfaces.

4. The device of claim 3 wherein: said housing is formed as a two-piece structure having a body portion of circular interior cross section and a cover portion, and wherein said bag holding said sphere is entrapped at its open end between said cover portion and said body portion and is secured at its closed end to the bottom of said interior portion of said housing.

5. The device of claim 4 wherein: a flexible retainer member is provided between said body portion and said cover portion of said housing to retain said sphere within said bag, said flexible retainer member also making electrical contact with said sphere.

6. The device of claim 5 wherein: said circuit means include a lead wire passing between said body portion and said cover portion of said housing, said wire being connected to said retainer member and thus to said metal sphere within the confinement bag.

* * * * *